J. MELBY.
HAY FORK.
APPLICATION FILED NOV. 20, 1908.
917,634.
Patented Apr. 6, 1909.
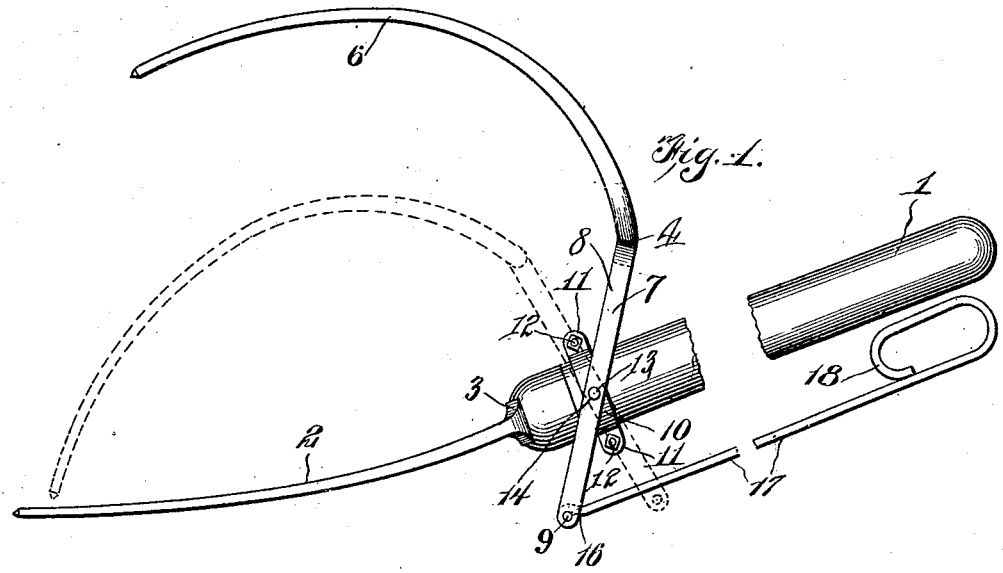
Fig. 1.
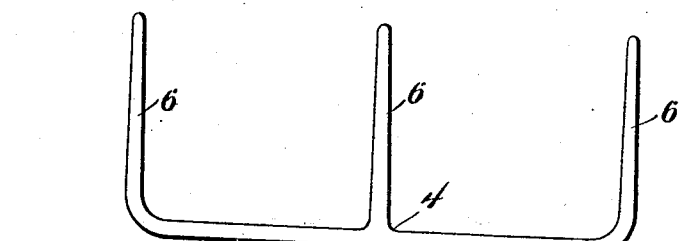
Fig. 2.
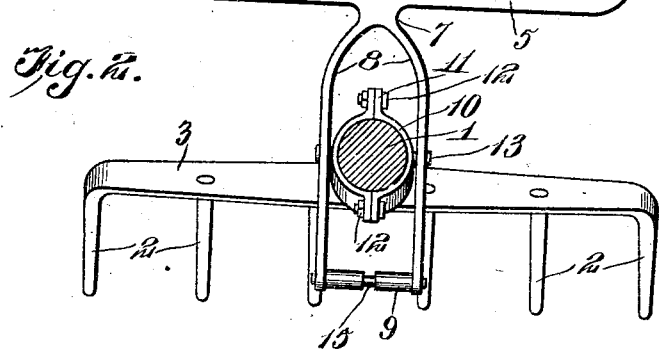
Witnesses
Inventor
Johannes Melby
By Victor J. Evans
Attorney

UNITED STATES PATENT OFFICE.

JOHANNES MELBY, OF BACKUS, MINNESOTA.

HAY-FORK.

No. 917,634.　　　　Specification of Letters Patent.　　　　Patented April 6, 1909.

Application filed November 20, 1908. Serial No. 463,670.

*To all whom it may concern:*

Be it known that I, JOHANNES MELBY, a citizen of the United States, residing at Backus, in the county of Cass and State of Minnesota, have invented new and useful Improvements in Hay-Forks, of which the following is a specification.

The invention relates to an improvement in hay forks and is particularly directed to an attachment designed to be readily attached to a hay fork of ordinary construction and adapted to materially increase the efficiency of the fork in turning hay or the like.

The main object of the present invention is the provision of an attachment for hay forks including a tine-carrying member arranged in opposition to the fork tines and mounted for pivotal movement under control of the operator, whereby the material may be secured to permit its convenient turning.

The invention will be described in the following specification, reference being had particularly to the accompanying drawings, in which:—

Figure 1 is a view in side elevation illustrating the construction and application of my improvement. Fig. 2 is an end elevation of the same, the clamping tines being shown in inoperative or elevated position.

Referring particularly to the accompanying drawings, my improvement is designed for use in connection with a hay fork, which, for the purposes of this invention, may be said to include a handle 1 and a series of tines 2 projecting from the cross bar 3 which is in turn connected to the handle in any appropriate manner. As is usual in constructions of this kind the tines 2 have a decided curvature in one direction, as will be readily apparent from Fig. 1 of the drawing.

In carrying out the improvement I provide what I term a tine carrying member 4 constructed to include a cross bar 5 from which project a series of tines 6, hereinafter termed the clamping tines. The tine carrying member is mounted for pivotal movement relative to the handle, as will later appear, and the tines thereof are curved in opposition to the curvature of the tines 2 and so arranged that when moved to operative position the tines 6 are adapted to pass between adjacent fork tines 2. From the cross bar 5 of the tine carrying member there is projected what I term a pivot loop 7 including spaced parallel bars 8, which at their free or lower ends are connected by a transversely arranged pin 9.

The tine carrying member is pivotally mounted upon a handle 1 by means of a clamping collar 10 made up in duplicate sections to encircle the handle, each provided with radially projected ears 11 designed when the sections of the collar are assembled to contact and receive clamping bolts 12, whereby the collar is secured in place on the handle. At a point at right angles to the ears 11 of the collar, the sections thereof are provided with radially projecting pivot pins 13, and the arms 8 of the pivot loop of the tine carrying member are formed about centrally of their lengths with openings 14 to engage the pivot pins, whereby the tine carrying member is pivotally secured on the handle. A pin 9 connecting the arms of the pivot loop is centrally reduced at 15 to receive an eye member 16 of an operating rod 17, which rod is adapted to project lengthwise the handle 1, and at an appropriate point for convenient operation is formed with a terminal finger loop 18.

From the above description taken in connection with the drawings it will be obvious that the operator can move the tine carrying member to the inoperative position shown in Fig. 2 and then manipulate the fork to cause the tines 2 thereof to pick up a quantity of material. By suitable operation of the rod 17 the tine carrying member may be then moved to the relative position shown in dotted lines in Fig. 1 with the effect to clamp the tines 6 of such member onto the upper surface of the material to permit any usual or desired handling of the fork without liability of displacement of the material picked up.

Having thus described the invention what is claimed as new, is:—

1. The combination with a hay fork, and a clamping collar removably connected to the fork, of a tine carrying member pivotally mounted on the collar, and means for operating said member to move the tines thereof to and from clamping relation with the tines of the fork.

2. The combination with a fork, of a tine carrying member including a cross bar having a series of tines projecting therefrom, a pivot loop projecting from the cross bar, means for pivotally connecting said loop to the fork handle, and means connected to said loop for controlling the pivotal movement of the member.

3. The combination with a hay fork comprising a handle and fork tines carried thereby, of a tine carrying member including a cross bar, a series of tines projecting therefrom, a pivot loop projecting from the cross bar, and a pin connecting the free terminals of said loop, a collar removably connected with the handle, means for pivotally connecting the loop to the collar, and an operating rod connected to the loop pin.

In testimony whereof I affix my signature in presence of two witnesses.

JOHANNES MELBY

Witnesses:
F. W. ZAFFKE,
J. W. BAILEY.